United States Patent [19]

Kelley

[11] 4,000,577
[45] Jan. 4, 1977

[54] FISH BAIT BOX

[75] Inventor: O. W. Kelley, Mequon, Wis.

[73] Assignee: Oxbow Products, Inc., Mequon, Wis.

[22] Filed: Dec. 29, 1975

[21] Appl. No.: 644,713

[52] U.S. Cl. ................................. 43/55; 43/56
[51] Int. Cl.² ................................. A01K 97/04
[58] Field of Search ............... 43/55, 56; 119/15; 220/22, DIG. 13

[56] References Cited

UNITED STATES PATENTS

| 2,001,468 | 5/1935 | Moutoux | 43/55 |
| 2,642,836 | 6/1953 | Brooks | 43/55 |
| 3,182,419 | 5/1965 | Zimmerman | 43/55 |
| 3,304,645 | 2/1967 | Hardesty et al. | 43/55 |

*Primary Examiner*—Warner H. Camp
*Attorney, Agent, or Firm*—James E. Nilles; Thomas F. Kirby

[57] ABSTRACT

A fish bait box having a chamber therein and an access opening through the top of the box has a bottom wall surface on its exterior whereby it can rest in upright position and slanted wall surfaces whereby it can selectively rest in either of two tilted positions. The chamber receives live bait and a shiftable medium for the bait and tilting of the box causes shifting of the medium from one end of the chamber to the other thereby exposing the bait for easy removal through the opening. The chamber can accommodate bait in the form of worms in a particulate bedding and tilting of the box causes roll-over of the bedding and exposure of the worms for easy removal. In another embodiment of the invention, a porous screen is provided to divide the chamber into two compartments. The chamber can then accommodate bait in the form of minnows in water, and tilting of the box causes water to drain from one compartment into the other compartment, leaving the minnows in the said one compartment exposed for easy removal.

13 Claims, 11 Drawing Figures

FISH BAIT BOX

BACKGROUND OF THE INVENTION

1. Field of Use

This invention relates generally to fish bait boxes for storing worms, minnows, or other forms of live bait. In particular, it relates to a fish bait box which may be tilted so as to rest in various positions, thereby causing displacement of the bait storage medium within the box nd enabling easier removal of the bait from the box.

2. Description of the Prior Art

The prior art discloses a wide variety of fish bait boxes. U.S. Pat. Nos. 2,642,836; 2,573,202; 3,315,402; 2,257,879; 2,484,122; 3,566,836; and 3,143,263 disclose examples of some prior art fish bait boxes.

U.S. Pat. No. 2,642,836 issued June 23, 1953, to C. A. Brooks for "Fish Bait Incubator" discloses a unit which contains two adjacent interconnected compartments which lie at an obtuse angle to one another and which are adapted to contain compost in which worms are cultivated. The unit can rest in and can be tilted between two extreme positions and tilting is facilitated by rounded rockers provided at the bottom of the unit. During tilting, the compost and worms are shifted from one compartment to the other. The unit is provided with two separate access doors which are selectively useable to afford access to whichever compartment contains the compost and worms. The unit may be rocked to aerate and loosen the compost.

SUMMARY OF THE PRESENT INVENTION

In accordance with the invention, a fish bait box having a chamber therein and an access opening through the top of the box comprises means on its exterior whereby it can rest in upright position or in either of two tilted positions. The chamber receives live bait and a shiftable medium for the bait and tilting of the box causes shifting of the medium from one end of the chamber to the other thereby exposing the bait for easy removal through the opening. The chamber can accommodate bait in the form of worms in a particulate bedding and tilting of the box causes roll-over of the bedding and exposure of the worms for easy removal. In another embodiment of the invention, a porous screen is provided to divide the chamber into two compartments. The chamber can then accommodate bait in the form of minnows in water, and tilting of the box causes water to drain from one compartment into the other compartment, leaving the minnows in the said one compartment exposed for easy removal.

Means are provided on the exterior of the box whereby it can rest in upright or either of two tilted positions. Such means comprise a central flat bottom wall on which it can rest in upright position and two upwardly slanted flat bottom walls adjacent the central bottom wall on which the box can rest in either of two tilted positions. The chamber is defined by surfaces shaped and arranged as hereinafter decribed in detail. The access opening to the chamber is provided with a slideably movable cover. The box is provided with integrally formed carrying handles.

DESCRIPTION OF PREFERRED EMBODIMENTS

Figure 1:
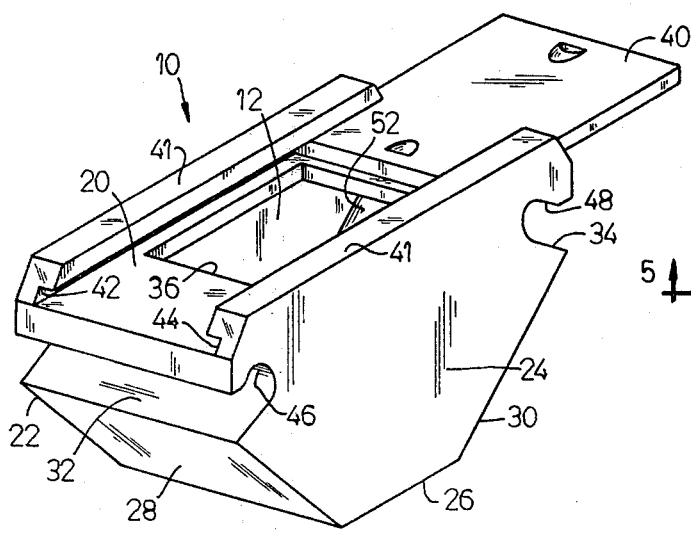
FIG. 1 is a perspective view of a fish bait box in accordance with the present invention.
Figure 4:
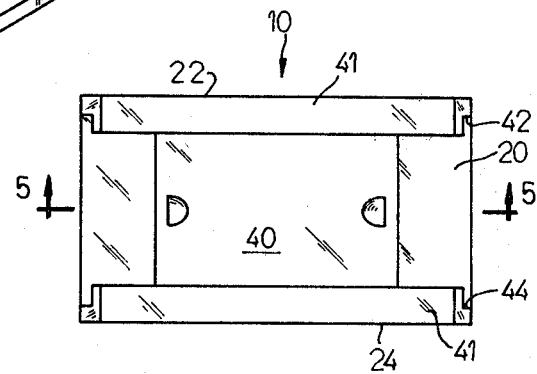
FIG. 4 is a top plan view of the box shown in FIG. 1.
Figure 3:
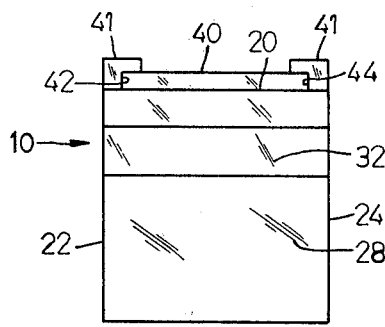
FIG. 3 is an end elevational view of the box shown in FIG. 1.
Figure 2:
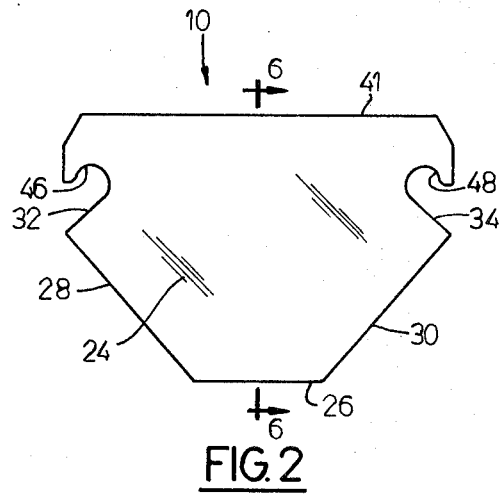
FIG. 2 is a side elevational view of the box shown in FIG. 1.
Figure 6:
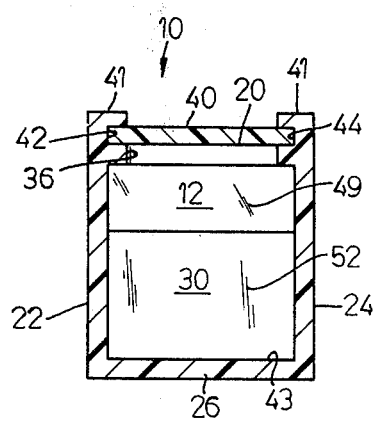
FIG. 6 is a cross section view of the box taken on line 6—6 of FIG. 2.
Figure 5:
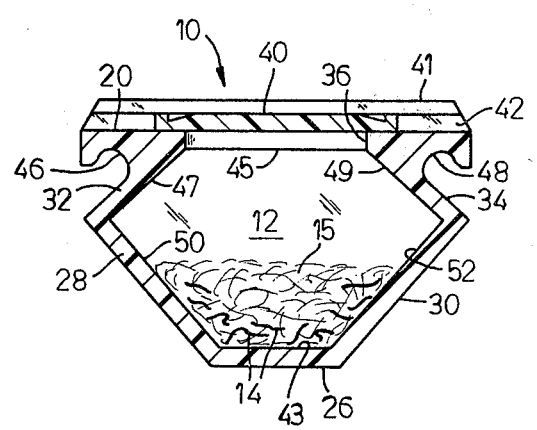
FIG. 5 is a cross section view of the box taken on line 5—5 of FIG. 4 and shows the box standing in an upright position.
Figure 7:
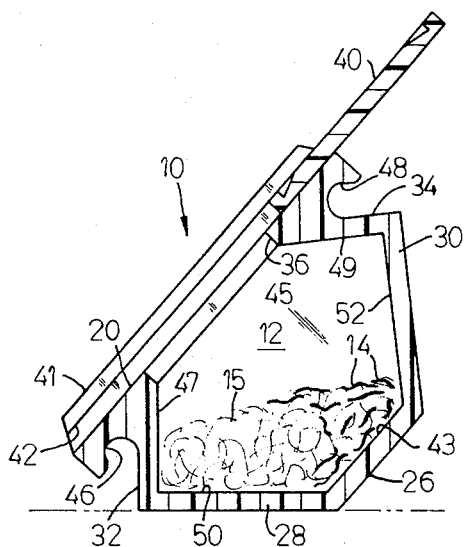
FIG. 7 is a cross sectional view similar to FIG. 5 but showing the box tilted to the left.
Figure 8:
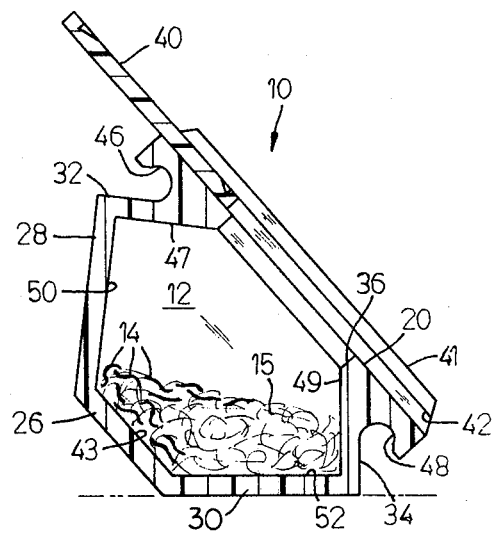
FIG. 8 is a view similar to the view of FIG. 5 but showing the box tilted to the right.

Referring to FIGS. 1 through 8, the numeral 10 designates a fish bait box in accordance with the present invention. Box 10 is preferably fabricated by molding from a plastic material, such as styrofoam or the like, and may be fabricated by joining together two or more molded components. Box 10 has a chamber 12 therein for receiving live bait and a shiftable medium for the live bait, as FIGS. 5, 7, and 8 show. The live bait may, for example, take the form of worms 14, and the shiftable medium may take the form of pelletized material 15, such as vermiculite, wadded newspaper, or other suitable materials. Box 10 is intended to take into account the fact that worms tend to crawl to the bottom and ball together in the bedding or medium in which they are disposed in the bait box. This makes it difficult for a fisherman to select and retrieve a worm from a bait box. The box 10 is designed, constructed, and operates so that it can rest in and be shifted between an upright position shown in FIG. 5, a leftward tilted position shown in FIG. 7, and a rightward tilted position shown in FIG. 8. In tilting box 10 between the two extreme positions shown in FIGS. 7 and 8, the medium 15 rolls over from one end of the chamber 12 to the other, and the worms 14 which were formerly near the bottom of the box end up near or in the top of the medium 15. A similar action occurs if box 10 is tilted between the upright position shown in FIG. 5 and either of the tilted positions shown in FIGS. 7 and 8.

Box 10 comprises a flat top wall 20 and a pair of laterally spaced-apart flat lateral side walls 22 and 24. Box 10 further comprises a first flat centrally disposed bottom wall 26, a second flat upwardly slanting lower end wall 28, and a third flat upwardly slanting lower end wall 30. The walls 26, 28, and 30 enable the box to rest in the positions shown in FIGS. 5, 7, and 8, respectively. Wall 28 is joined to and slants upwardly from one end of central wall 26. Wall 30 is joined to and slants upwardly from the other end of central wall 26. The walls 28 and 30 are upwardly diverging. Upper end walls 32 and 34 are connected between the top wall 20 and the lower end walls 28 and 30, respectively. The upper end walls 32 and 34 are downwardly diverging. Top wall 20 is provided with a centrally located access opening 36 which extends therethrough and affords access to the chamber 12 and serves as the means whereby bait and medium are supplied to and removed from the chamber. Box 10 is provided with a cover 40 for the opening 36. Cover 40 takes the form of a rectangular member which is slideably secured to top wall 20 so that it can be shifted in opposite directions to uncover the opening 36. Cover 40 is shown in closed position in FIGS. 4 and 5, and is shown in two different open positions in FIGS. 7 and 8. The lateral edges of cover 40 slideably engage grooves 42 and 44 which are integrally formed in upwardly extending projections 41 on the top wall 20 of box 10. Box 10 is provided with integrally formed carrying handles which take the form of grooves 46 and 48 on the underside and near the ends of top wall 20 of box 10.

As FIGS. 5, 6, 7, and 8 show, the chamber 12 in box 10 has substantially the same longitudinal cross sectional contour as the exterior of box 10. Chamber 12 is defined by wall surfaces including a top surface 45, a bottom surface 43, oppositely disposed downwardly and outwardly diverging upper end surfaces 47 and 49 and oppositely disposed downwardly and inwardly converging lower end surfaces 50 and 52. The lower end surfaces 50 and 52 join the upper end surfaces 47 and 49, respectively. The upper end surfaces 47 and 49 are joined to the top wall surface 45. The lower end surfaces 50 and 52 join the bottom surface 43. As FIG. 5 shows, when box 10 is upright, the surface 48 of chamber 12 is horizontal and both surfaces 50 and 52 slant upwardly. As FIG. 7 shows, when box 10 is tilted to the left, chamber surface 50 becomes horizontal, chamber surface 43 slants upwardly, and chamber surface 52 assumes a position wherein it is past vertical so that the medium 15 within chamber 12 cannot accumulate against wall surface 52 but must tumble downwardly. Similarly, in FIG. 8, when box 10 is tilted to the right, chamber surface 52 is horizontal, chamber surface 42 slants upwardly, and chamber surface 50 is past vertical thereby preventing the medium 15 from accumulating thereagainst.

As will be noted from FIG. 5, when box 10 is upright, the bottom wall 26 and top wall 20 are both generally horizontal. When box 10 is tilted to either of the positions shown in FIGS. 7 and 8, the top side 20 assumes an angular or sloped disposition making it convenient for the user to reach through opening 36 into the chamber 12 to remove a worm 14. Normal use positions are shown in FIGS. 7 and 8.

Preferably, box 10 is fabricated of material which has thermal insulating properties so as to provide the bait with cool environment if box 10 is exposed for long periods of time to sunlight or to high ambient temperatures. Furthermore, the roll-over action produced by the manipulation of box 10 as it is tilted from FIG. 7 to FIG. 8 or vice-versa not only overcomes the tendencies of the worms to ball up but also effects more even distribution of moisture saturating the medium 15.

Figure 9:
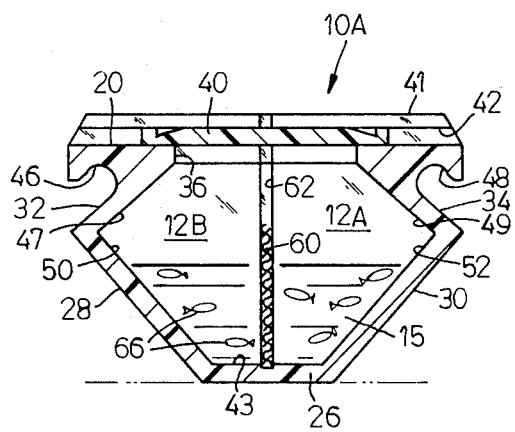
FIG. 9 is a cross sectional view similar to FIG. 5 but showing another embodiment of the invention wherein a screen divides the box into two chambers.
Figure 10:
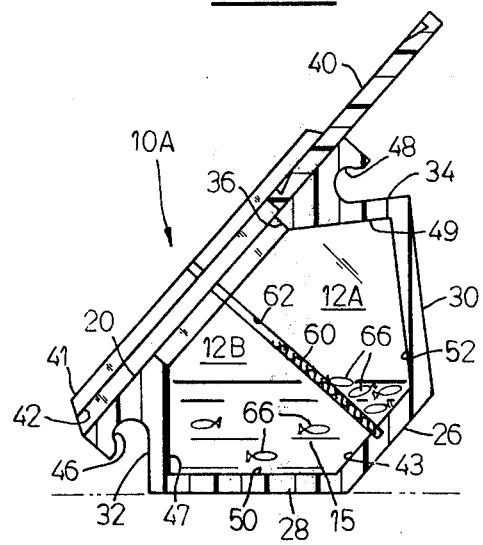
FIG. 10 is a view similar to FIG. 9 but showing the box tilted to the right.
Figure 11:
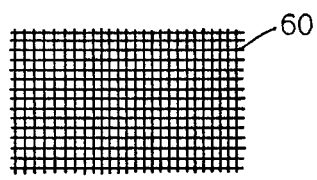
FIG. 11 is a plan view of the screen shown in FIG. 9.

Referring to FIGS. 9 and 10, there is shown a bait box 10A in accordance with the present invention which is similar in all physical respects to the box 10 hereinbefore described except that it is provided with a wire mesh screen 60, as shown in FIG. 11, which is disposed within chamber 12 of box 10A so as to divide chamber 12 into two compartments designated 12A and 12B. Screen 60 is supported within chamber 12 by screen securing means which, for example, take the form of grooves 62 which are provided in the inside wall surfaces of the side walls 22 and 24, respectively, of box 10A. If preferred, other means could be employed to secure screen 60 in chamber 12 of box 10A. Screen 60 is disposed transversely of the longitudinal axis of box 10A. In box 10A, the live bait employed comprises minnows 66 which are disposed therein and the shiftable medium 15 takes the form of water. The minnows 66 are located in both compartments 12A and 12B. When box 10A is tilted from the upright position shown in FIG. 9. to the leftwardly tilted position shown in FIG. 10, the water in compartment 12A flows through screen 60 into compartment 12B and the minnows 66 in compartment 12A come to rest against screen 60 in compartment 12A and are quite easily removed from chamber 12 through opening 36. Obviously, if box 10A were tilted rightwardly, from the upright position shown in FIG. 9, water would shift from compartment 12B into compartment 12A and the minnows 66 in compartment 12B could be more easily removed. As is apparent, if screen 60 were removed from box 10A, the box 10A could be filled with worms and a particulate medium as described in connection with box 10 and could be employed in the same manner as box 10. Also, when the boat or car motion rocks the box 10A, water splashes through screen 60 and this action aerates the water to replenish air in the water to help keep the minnows alive.

A fish bait box in accordance with the present invention offers numerous advantages over prior art devices. For example, the box may be used to store live bait which is disposed in a shiftable medium of dry particulate form or in liquid form, thereby adding to the versatility of the box. The box tends to prolong the life of the live bait kept therein because of the roll-over and aerating action occurring during tilting. A box in accordance with the invention is economical and easy to fabricate and can be made at a relatively low cost. A box in accordance with the invention is simple and fool-proof in construction and employs a minimum of relatively movable parts. A box in accordance with the invention can be entirely made, for example, of non-metallic, non-corrosive material which is especially advantageous in fishing gear. Other objects and advantages of the invention have hereinbefore been explained or are apparent. In an actual embodiment of the invention, for example, the box 10 had an overall length of 10½ inches and a maximum width of 6 inches. The walls were on the order of ½ inch thick. The cover was on the order of 6½ inches long and 5 inches wide. The interior angle formed in chamber 12 by the wall surfaces 47 and 50 was on the order of 48½° and the angle formed by the wall surfaces 49 and 52 was on the order of 48½°.

I claim:

1. In a fish bait box having an upper wall and having a chamber therein live bait and a shiftable medium for said live bait;

an opening in said upper wall of said box affording access to said chamber and from which bait is withdrawn; and means on the exterior of said box to enable said box to rest in and be tilted between an upright position and at least one other tilted position, whreby during tilting the medium is shifted from one end of said compartment toward the other, said means on the exterior of said box comprising a first surface on which said box rests when in said upright position, said first surface being opposite said upper wall, and a second surface slanting upwardly at an angle from one end of said first surface and on which said box rests when in said one other tilted position, said angle being such that said upper wall is non-vertical when said box is in upright position and in tilted position.

2. A box according to claim 1 including a screen dividing said chamber into two compartments, each of said two compartments being accessible through said opening, said screen enabling said medium to flow between said two compartments but preventing said live bait from moving between said compartments.

3. A box according to claim 1 including a cover for said opening, said cover being slideably mounted on the exterior of said box.

4. A box according to claim 3 including a pair of integrally formed carrying handles formed on the exterior of said box.

5. In a fish bait box having an upper wall and having a chamber therein for receiving live bait and a shiftable medium for said live bait:
an opening in said upper wall of said box affording access to said chamber; and
means on the exterior of said box to enable said box to rest in and be tilted between an upright position and at least two tilted positions whereby during tilting the medium is shifted from one end of said compartment toward the other end, said means on the exterior of said box comprising a first surface on which said box rests when in said upright position, said first surface being opposite said upper wall, a second surface slanting upwardly at an angle from one end of said first surface and on which said box rests when in one tilted position,
and a third surface slanting upwardly at an angle from the opposite end of said first surface and on which said box rests when in the other tilted position, said angles being such that said upper wall is non-vertical when said box is in upright position and in said two tilted positions.

6. A box according to claim 5 including a screen dividing said chamber into two compartments, each of said two compartments being accessible through said opening, said screen enabling said medium to flow between said two compartments but preventing said live bait from moving between said compartments.

7. A box according to claim 5 including a cover for said opening, said cover being slideably mounted on the exterior of said box.

8. A box according to claim 7 including a pair of integrally formed carrying handles formed on the exterior of said box.

9. In a fish bait box:
a chamber for receiving live bait and a shiftable medium for said live bait,
said chamber being defined by wall surfaces including an upper surface, a lower surface, oppositely disposed downwardly and outwardly diverging upper end surfaces and oppositely disposed downwardly and inwardly converging lower end surfaces,
each of the lower end surfaces joining one of the upper end surfaces, each of the upper end surfaces being joined to said upper surface, each of the lower end surfaces being joined to said lower surface,
an opening through said upper surface affording access to said chamber and from which bait is withdrawn; and
means on the exterior of said box to enable said box to rest in and be tilted between an upright position wherein said lower surface is substantially horizontal and at least two tilted positions wherein one of said lower end surfaces is substantially horizontal, whereby during tilting the medium is shifted from one end of said compartment toward the other end, said means on the exterior of said box comprising a first surface on which said box rests when in said upright position, a second surface slanting upwardly from one end of said first surface and on which said box rests when in one tilted position,
and a third surface slanting upwardly from the opposite end of said first surface and on which said box rests when in the other tilted position.

10. A box according to claim 9 including a cover for said opening, said cover being slideably mounted on the exterior of said box.

11. A box according to claim 9 including a screen dividing said chamber into two compartments, said screen enabling said medium to flow between said two compartments but preventing said live bait from moving between said compartments.

12. A box according to claim 10 including a pair of integrally formed carrying handles formed on the exterior of said box.

13. In a bait box having a chamber therein for receiving live bait and a shiftable medium for said bait in the form of water;
an opening on the upper side of said box affording access to said chamber;
means on the exterior of said box enabling said box to rest in and be tilted between an upright position and at least one tilted position; and
a screen extending between the walls of said chamber and dividing said chamber into two compartments, each of said two compartments being accessible through said opening,
said screen enabling unrestricted water flow between said compartment but preventing transfer of said live bait between said compartments as said box is tilted from upright to said one tilted position, whereby when said box is moved from upright to tilted positions water flows from one compartment to another and exposes the bait in said one compartment for removal through said opening.

* * * * *